United States Patent [19]

Freeman et al.

[11] Patent Number: 4,968,538
[45] Date of Patent: * Nov. 6, 1990

[54] ABRASION RESISTANT COATING AND METHOD OF APPLICATION

[75] Inventors: John E. Freeman; Ronald L. Clanton, both of Big Spring, Tex.

[73] Assignee: Freecom, Inc., Big Spring, Tex.

[*] Notice: The portion of the term of this patent subsequent to Dec. 6, 2005 has been disclaimed.

[21] Appl. No.: 275,763

[22] Filed: Nov. 23, 1988

Related U.S. Application Data

[63] Continuation-in-part of Ser. No. 3,298, Jan. 14, 1987, Pat. No. 4,789,567.

[51] Int. Cl.⁵ .................................................. B05D 1/36
[52] U.S. Cl. ................................. 427/410; 427/388.1; 427/386
[58] Field of Search .................. 427/410, 388.1, 386

[56] References Cited

U.S. PATENT DOCUMENTS

| | | | |
|---|---|---|---|
| 3,042,545 | 7/1962 | Kienle et al. | 427/410 |
| 3,156,580 | 11/1964 | Howard | 427/410 |
| 3,507,357 | 4/1970 | Blome | 427/410 |
| 3,762,939 | 10/1973 | Hunter | 427/388.2 X |
| 4,179,542 | 12/1979 | Christofas | 427/410 |
| 4,180,166 | 12/1979 | Batdorf | 427/386 |
| 4,312,902 | 1/1982 | Murase et al. | 427/388.2 X |
| 4,423,094 | 12/1983 | Dearlove et al. | 427/386 |
| 4,560,579 | 12/1985 | Siadat et al. | 427/386 |
| 4,620,994 | 11/1986 | Suss et al. | 427/410 |

*Primary Examiner*—Merrell C. Cashion, Jr.
*Assistant Examiner*—Leon R. Horne
*Attorney, Agent, or Firm*—Matthews & Associates

[57] ABSTRACT

A protective coating of finely divided abrasion resistant resin is diluted with a solvent and applied to a surface. The applied coating is cured to achieve either a single layer of inert dispersed in the resin, or two layers including a dense layer of inert in resin covered by a thin layer of resin, and to provide a glossy or matte appearance as desired.

9 Claims, 1 Drawing Sheet

ABRASION RESISTANT COATING AND METHOD OF APPLICATION

This is a continuation-in-part of co-pending application Ser. Nos. 03298 filed on Jan. 14, 1987, U.S. Pat. No. 4,789,567.

FIELD OF THE INVENTION

This invention relates generally to protective coatings and a method for applying the coating. More particularly the invention pertains to a coating comprising an inert abrasion resistant material carried in a corrosion resistant resin and a method for applying the coating by using a diluent solvent and curing steps to achieve desired coating characteristics. The present invention provides a coating suitably applied over a wide range of applications to metal surfaces, metal pipes and plates; commercial and military transportation and aviation equipment, vehicles, ships and planes; and to industrial products and construction equipment such as truck beds, lawn mowers, pump internals, warehouse flooring, sporting equipment, and railway, oilfield, refinery and waste water treatment facilities, to list a few illustrative examples.

BACKGROUND OF THE INVENTION

Coatings have been developed which exhibit excellent abrasion and corrosion resistance. These coatings have finely divided inert particles dispersed in a resin which is then mixed with a hardening catalyst and applied. The inert particles may be in the form of irregularly shaped granules or spherical depending upon the method of manufacture and may range in size from a few angstroms to several microns in diameter.

The resin is selected for its corrosion resistant properties and some commonly used include epoxy, polyester and vinyl ester resins. Ceramic is commonly used as the inert, but any other abrasion resistant compound may be used.

A coating commercially available is manufactured by Owens-Corning and marketed under the name Owens-Corning Abrasion Resistant Coating. The Owens-Corning coating contains 90% by weight finely divided ceramic particles dispersed in 10% by weight Bisphenol A epoxy resin. Additionally, a compound has been included which adds flexibility to the coating as applied.

The resin carrying the inert particles must be mixed with an appropriate hardening catalyst before application. Generally both the resin and catalyst are supplied from the coating manufacturer with instructions as to mixing.

When the epoxy and catalyst are mixed as received for the manufacturer, a highly viscous liquid is obtained. Such highly viscous liquid is difficult to apply evenly while covering the surface completely. Some manufacturers, such as Owens-Corning, do not recommend thinning with any solvent, leaving the applicator to determine how best to apply the coating. Without thinning, a coating of 25 mils is necessary to achieve a completely covered, i.e. holiday free, surface.

While experimentation may lead to the best solvent for thinning, there is no indication in the prior art indicating the effect by the thinner used on the final surface. The present invention relates directly to a combination of thinning solvent and curing which leads to a desired surface finish and coating qualities.

Surface preparation has been found to be critical in order to best retain the coating on the surface. Generally, sand blasting to white metal with sand, plastic grit, steel shot, garnet, or the equivalents is used, and some experimentation has been necessary to determine the necessary anchor pattern.

In addition to the use of a solvent, various additives can greatly enhance the qualities of the final product. Depending upon the requirements for the final product silicon dioxide can also be added in varying percentages as an addition to the resin and inert mixture, as can varying amounts of Novolac resins and polyglycol resins.

OBJECTS OF THE INVENTION

In light of the above, it is thus an object of the present invention to provide a method for applying an inert-resin coating evenly and, most economically, in economic thickness.

It is another object of the invention to provide a method for applying an inert-resin coating which produces a selection of final surface finishes.

It is further object of the invention to provide a combination of use of thinning solvent and curing to determine the final finish as applied to the surface, and to provide various additions to a base composition to enhance its applicability and durability.

DESCRIPTION OF THE PREFERRED EMBODIMENT

Figure 1:
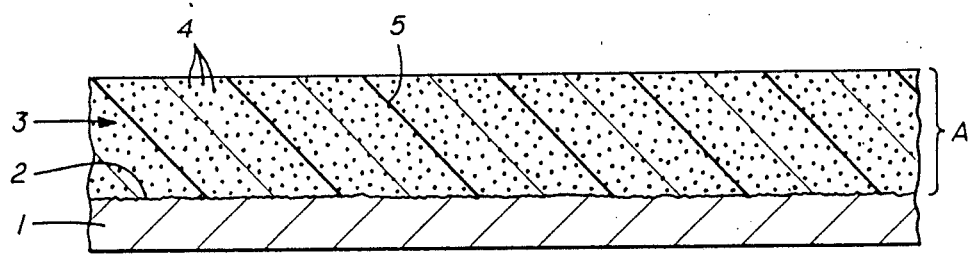
FIG. 1 is a side sectional view of a coating as applied on a surface using a fast cure method.

In the preferred embodiment of the invention, a coating composition having a finely divided inert powder, e.g. 1 angstrom to 1 micron diameter particles, in a resin coating is applied to a specially prepared surface.

The surface is first sand blasted to obtain 0.5 mil to 2 mil anchor pattern. This anchor pattern has been achieved by sand blasting the surface to white metal with No. 2 grit sand or No. 3 grit steel shot or other suitable media. The surface is then cleaned to remove all traces of dust and other particles left by the sand blasting. Air blowing the surface has been found to be sufficient. Wiping the surface with methyl-ethyl-keytone (MEK) has also been found to be effective.

The inert-resin composite is then mixed with the appropriate catalyst as recommended by the manufacturer. At the same time, the inert-resin-catalyst is diluted with the appropriate solvent and applied in the conventional manner by spraying, brushing or rolling upon the surface, or by dipping the item to be coated.

Varient embodiments utilize the addition of silicon dioxide or other additives, which may be added to the base Owens-Corning Abrasion Resistant Coating (or equivalent) prior to the addition of the appropriate catalyst as will be described below.

Experimentation has shown that a mixture without silicon dioxide containing four parts by volume epoxy, one part by volume catalyst, and one-half part by volume solvent allows an even application and complete surface coverage, i.e. holiday free, with coatings as thin as 4 to 5 mils. For many applications, the thickness obtained compares very favorably to the 25 mil coating required to obtain a holiday free coating using the undiluted coating as provided by the manufacturer.

Since the coating itself contains abrasive ceramic particles, the spraying equipment must have abrasion resistant materials, such as carbide, in all wear areas such as tips and nozzles. Such equipment for applying abrasive material is readily available and known in that art.

The particular solvent used to dilute the coating may vary with the resin which carries the inert particles. The solvent used should be 1) mutually soluble with resin-catalyst and 2) flash readily. Additionally, if the coating contains any special compounds, as the Owens-Corning coating, the solvent should not chemically react with such compounds.

After dilution and application, the coating is cured to achieve the desired properties. If the applicator wishes to have the inert dispersed evenly throughout the coating, then the applied coating is fast cured at 250° F. to 300° F. for one to two hours as soon as possible after application. This produces a dull matte finish due to the even dispersion of the particles.

If a more dense inert in resin layer is desired, the coating as applied may be allowed to stand for ½ to 1 hour at room temperature (72° F) prior to curing at 250° F. to 300° F. This allows the inert to settle in the diluted resin during initial hardening forming a layer 3½ to 4 mils thick which is covered by a glossy layer of resin 1 to 1½ mil thick of corrosion resistant resin. The top layer will be quickly worn away in abrasive service but the more dense inert-resin layer exhibits enhanced abrasion resistance when compared to the single layer. The same two layers effected may be achieved by simply allowing the applied coating to cure at room temperature (72° F.) for 8 to 12 hours. Cure is faster at warmer temperatures and slower at cooler temperatures.

The following example of a coating and application relates specifically to the Owens-Corning Abrasion Resistant Coating.

In the example, an Owens-Corning coating composition having finely divided ceramic particles and polyminate elastomer carried in a Bisphenol A epoxy resin is applied to a specially prepared surface, although alternate epoxies can be substituted. The coating, as received from the manufacturer, is 90% by weight ceramic and 10% by weight epoxy resin. Additionally, experiments indicate the coating has one molecule of polyaminate elastomer for every forty second ceramic particle.

After the surface has been sandblasted to achieve a 0.5 mil to 2 mil anchor pattern, the coating compound and catalyst are mixed and diluted with a solvent in the proportion of four parts by volume epoxy, one part catalyst, and one half part solvent. As noted, if the flexibility provided by the elastomer is desired the solvent must not chemically react with the elastomer.

For the Owens-Corning abrasion resistent coating, two such solvents have been found - hospital grade isopropyl alcohol (99% by volume alcohol) and methyl-ethyl-keytone (MEK).

Both MEK and 99% alcohol provide sufficiently flexible surface coatings.

After application, the coating must be cured to achieve the desired rigidity and surface finish. The curing step and the diluent solvent are used in combination to select the final finish. The dilution and curing steps also affect the distribution of the ceramic in the epoxy.

A dull matte finish may be obtained with any of the solvents by immediately fast-curing the coating at 275° F. for one hour. The MEK solvent and isopropyl alcohol provide a sufficiently flexible surface coating. The fast curing disperses the ceramic and elastomer evenly in the epoxy resin throughout the thickness of the coating. The final coating as obtained by the fast curing method is illustrated in FIG. 1. The material to be coated is indicated at 1 with a 0.5 mil surface anchor pattern shown generally at 2. The ceramic particles 4 and elastomer 5 are shown dispersed evenly throughout the epoxy 3 layer A.

An alternative, or additional step that can be used to produce a dull matt finish is the addition of silicon dioxide (chemical name and family — synthetic amorphous silica, synonyms -amorphous silicon dioxide — silica gel silicic acid, chemical notation or structure — $SiO_2 \cdot XH_2O$). The addition of silicon dioxide in a ratio of from 4% to 20% based on the weight of the base material can be added to the above described composition. As compared with the earlier described composition the addition of the silicon dioxide increases the percentage of solids in the composition therefore the percentage of the epoxy is decreased. The quantity added will be determined by the final application of the coating. In the higher levels, the material will be flat in color instead of glossy. At the higher which provides a flat or dull matte finish the coating will satisfy military requirements for non-glare paints and coatings. Also, the addition of the silicon dioxide enhances the abrasion resistance and resistance to acid environments.

Other embodiments of the present invention are provided by the further additions of either generic Novolac epoxy resin or generic polyglycol type resins purchased from a commercial manufacturer, or both, to the mixture before curing steps begin.

The addition of silicon dioxide also improves the handling of the material and ease of materials application. In contrast to the first described base composition coating material, the material with silicon dioxide can be sprayed or applied in one pass to thicker millage. The first described coating applies at 3 to 4 mils. At thicker applications the possibility of runs or sags increases. The coating with the added silicon dioxide will build to 14 mils. on a vertical surface without runs or sags.

A glossy finish may be obtained in one of two ways. The coating may simply be cured at room temperature (72°) for 8 to 12 hours. Alternatively the coating may be cured for ½ hour at room temperature and then fast cured at 250° F. to 300° F. for 1 to 2 hours. As above, the flexibility of the coating is affected by the solvent used. The use of MEK or isopropyl alcohol produces a sufficiently flexible coating.

Figure 2:
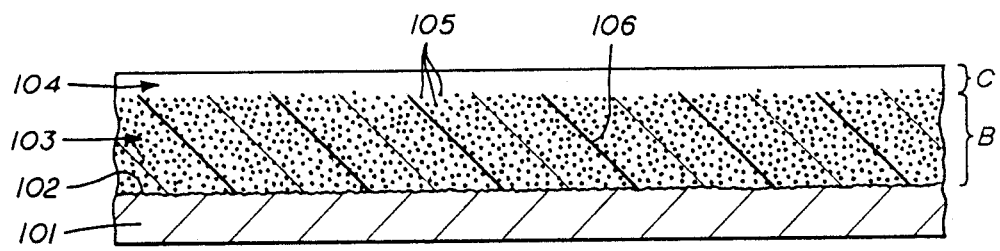
FIG. 2 is a side sectional view of a coating as applied using either room temperature curing or combination room temperature and fast curing.

In addition to producing a glossy finish, the room temperature curing and combination room temperature fast curing causes the ceramic and elastomer to settle into a layer of epoxy approximately 3½ to 4 mils thick leaving a clear epoxy layer approximately 1½ to 1 mil thick. The solvent facilitates this process by reducing the viscosity of the epoxy resin during hardening caused by the catalyst. In effect, this makes a more dense ceramic-elastomer coating nearer the surface coated which enhances the abrasion resistance of the coating. The final coating as obtained by the room temperature curing or combination room temperature fast curing is shown for illustration purposes in FIG. 2. The material to be coated is shown generally at 101 having a 0.5 mil surface anchor pattern shown at 102. The ceramic particles 105 and elastomer molecules 106 settle into a layer B of epoxy 103 approximately 3½ to 4 mils thick. A top layer C of hardened epoxy 104 is approximately 1½ mil thick. As compared to FIG. 1, it can readily be seen that the ceramic and elastomer are more densely carried in the epoxy providing and enhanced abrasion resistance in layer B while layer C may erode away during service.

The glossy surface, in addition to being attractive, is especially useful in the interior coating of pipe in that it reduces friction due to flow, and thus reduces pressure drop and resultant pumping cost.

Novolac resin can be added to the Owens-Corning ARC base composition material to produce an alternative embodiment of the invention. This increases the cross-link density of the base ARC which improves chemical resistance, increases volume, which ends up lowering cost per gallon. It improves material to the point of performing extremely close to the properties of phenolic resins which are the best available at this time, but which have some restrictions on application.

Novolac resins are thermoset plastic materials offering alternatives to bisphenol A-based epoxies and phenolic resins, when formulators and fabricators seek good strength and good chemical resistance at high temperatures. Novolac epoxy combine in one molecule the thermal stability of a phenolic backbone with the reactivity and versatility of an epoxy resin. The resulting resins have multi-epoxy functionality. These additional reactive sites, as compared to a bisphenol A-type resin, produce tightly cross-linked cured systems with improved resistance to acids, bases and solvents; retention of good mechanical properties at high temperatures; minimal shrinkage for accurate reproduction; acceptance of a wide range of modifiers, fillers, and pigments; and improved high temperature adhesive properties.

The Novolac resin is dissolved with 50% MEK (methyl-ethylkeytone) by weight of Novolac. This total solution is added at from 3.5% to 10% by weight of the base Owens-Corning ARC, with a particular embodiment utilizing 5.2% by weight of the base Owens-Corning, ARC.

Polyglycol type resins can also be utilized as an additive. Polyglycol di-epoxide imparts flexibility, elongation, and improved impact when blended with conventional resins with some improvement in heat distortion temperature and chemical resistance. A particular embodiment utilizing this additive would blend in polyglycol di-epoxide at 1.7% by weight of the Owens-Corning ARC base composition. Other possible embodiments would use from 0.7% to 2.7% polyglycol.

Synthetic amorphous silica is a fine-sized, synthetic amorphous silica, not to be confused with crystalline silica such as quartz, cristobalite or tridymite or with diatomaceous earth or other naturally occurring forms of amorphous silica that frequently contain crystalline forms.

This silica material can be added into the base composition solution to increase its ability to reduce "runs" and "sags" when applying the material. It also increases the abrasion resistance of the coating. The silica will be evenly dispersed throughout the coating in a similar manner to the inert 4 illustrated in FIGS. 1 and 2. In larger quantities, the silica causes the material to have a "flat" finish as compared to a "glossy" finish, and is thus particularly suited as a coating for military equipment.

The total mixture still "layers" during cure as previously described but is better for corrosion resistance, abrasion resistance, and application.

The silica material is added at the rate of between 4%–20% based on the weight of the total mixture without this material. The lesser percentages do not affect the "glossiness" of the finished cured product, but the higher levels cause the material to cure "flat".

The Novolac is usually a solid pellet when received and is dissolved in MEK as described above. This mixture and the polyglycol are added to the ARC material and mixed. Once this material is fully mixed, the synthetic amorphous silica is added and mixed n thoroughly. MEK is added if needed to adjust viscosity.

Curing process, temperatures, and times for embodiments incorporating any or all of the described additives are unchanged from those described for the base composition coating. A preferred catalyst for all embodiments would be a combination of MIK (methyl-isobutyl-keytone), Modified Polyamine, Phenol, and Polyamide. The additives are mixed into solution prior to the addition of any catalyst.

The above description is not intended to limit the scope of the invention to that described, since different coatings may be applied using different solvents as selected and different curing processes and catalysts as experimentation would lead a person of ordinary skill in the art to practice.

What is claimed:

1. A method for protecting metal surfaces, said method comprising the steps of:
    (a) sand blasting said surfaces to provide a prepared surface having a desired anchor pattern;
    (b) removing substantially all dust particulant material from said prepared surface;
    (c) mixing a corrosion resistant resin containing finely divided abrasion resistant particles with the appropriate hardening catalyst for said resin to form a base composition coating mixture;
    (d) diluting said coating mixture with a selected solvent to allow even application of said coating mixture;
    (e) applying said coating mixture to said prepared surface to obtain a desired thickness; and
    (f) curing said coating as applied at room temperature of 72° F. for 8 to 12 hours to obtain a coating on said surface having a first layer of concentrated abrasion resistant particles proximate said surface and a second layer of corrosion resistant resin over said first layer, wherein said corrosion resistant resin comprises 90% by weight finely divided ceramic particles and a 10% by weight bisophynol A epoxy resin including a polyamide elastomer.

2. The invention of claim 1 including the steps of:
    (a) adding to the corrosion resistant resin and solvent mixture a solution comprising Novolac resin dissolved in 50% methyl-ethyl-ketone by weight of the Novolac, wherein the Novolac methyl-ethyl-ketone solution is added in the range of from 3.5% to 10% by weight of the base composition.
    (b) blending a polyglycol di-epoxide resin in the range of from 0.7% to 2.7% by weight of the base composition; and,
    (c) the addition of silicon dioxide in the ratio of from 4 to 20% based on the weight of the base resin-solvent mixture.

3. The method of claim 2 wherein the Novolac-methyl-ethyl-ketone solution added is 5.2% by weight of the base composition and the polyglycol added is 1.7% by weight of the base composition.

4. A method for protecting metal surfaces, said method comprising the steps of:
   (a) sand blasting said surface to provide a prepared surface having the desired anchor pattern;
   (b) removing substantially all dust and particulant material from said prepared surface;
   (c) mixing a corrosion resistant resin with finely divided abrasion resistant particles with the appropriate hardening catalysts for said resin to form a base composition coating mixture wherein said corrosion resistant resin coating comprises 90% by weight finely divided ceramic particles and a 10% by weight bisophynal A epoxy resin including a polyamide elastomer;
   (d) diluting said coating mixture with a selected solvent to allow even application of said coating mixture;
   (e) applying said coating mixture to said prepared surface to obtain a desired a thickness; and,
   (f) sequentially curing said coating as applied first at room temperature (72° F.) for ½ to 1 hour and then at 250° F. to 300° F. for 1 to 1½ hours to obtain a coating on said surface having a first layer of concentrated abrasion resistant particles proximate said surface and a second layer of corrosion resistant resin over said first layer.

5. The invention of claim 4 further comprising the steps of:
   (a) adding to the base composition mixture a solution comprising Novolac resin dissolved in 50% methyl-ethyl-ketone by weight of the Novolac, wherein the Novolac methyl-ethyl-ketone solution is added in the range of from 3.5% to 10% by weight of the base resin-solvent;
   (b) blending in a polygylcol di-epoxide resin in the range of from 0.7% to 2.7% by weight of the base composition; and,
   (c) the addition of silicon dioxide (chemical name and family — synthetic amorphous silica, synonyms-amorphous silicon dioxide — silica gel silicic acid, chemical notation or structure — $SiO_2 \cdot XH_2O$) in the ratio of from 4 to 20% based on the weight of the base resin-solvent mixture.

6. The invention of claim 5 wherein the Novolac-methyl-ethyl-ketone solution added is 5.2% by weight of the base composition and the polyglycol added is 1.7% by weight of the base composition.

7. A method for protecting metal surfaces, said method comprising the steps of:
   (a) sand blasting said surface to provide a prepared surface having the desired anchor pattern;
   (b) removing substantially all dust and particulant material from said prepared surface;
   (c) mixing a corrosion resistant resin finely divided abrasion resistant particles with the appropriate hardening catalysts for said resin to form a base composition coating mixture wherein said coating corrosion resistant resin comprises 90% by weight finely divided ceramic particles and a 10% by weight bisophynal A epoxy resin including a polyamide elastomer;
   (d) diluting said coating mixture with a selected solvent to allow even application of said coating mixture;
   (e) applying said coating mixture to said prepared surface to obtain a desired a thickness; and,
   (f) sequentially curing said coating at 250° F. to 300° F. for 1 to 1½ hours to obtain a corrosion resistant coating having said abrasion resistant particles evenly dispersed through said resin.

8. The invention of claim 7 further comprising the steps of:
   (a) Adding to the base composition a solution comprising Novolac resin dissolved in 50% methyl-ethyl-ketone by weight of the Novolac, wherein the Novolac methyl-ethyl-ketone solution is added in the range of form 3.5% to 10% by weight of the base resin-solvent.
   (b) blending in a polyglycol di-epoxide resin in the range of from 0.7% to 2.7% by weight of the base resin-solvent mixture.
   (c) the addition of silicon dioxide (chemical name and family — synthetic amorphous silica, synonymsamorphous silicon dioxide — silica gel silicic acid, chemical notation or structure — $SiO_2 \cdot XHhd 2O$) in the ratio of from 4 to 20% based on the weight of the base resin-solvent mixture.

9. The invention of claim 8 wherein the Novolac-methyl-ethyl-ketone solution added is 5.2% by weight of the base composition and the polyglycol added is 1.7% by weight of the base composition.

* * * * *